United States Patent [19]
Squires

[11] 3,815,202
[45] June 11, 1974

[54] PIPE JOINER

[76] Inventor: Jack E. Squires, P.O. Box 495, McMinnville, Oreg. 97128

[22] Filed: Sept. 14, 1972

[21] Appl. No.: 289,007

[52] U.S. Cl. .............................................. 29/200 P
[51] Int. Cl. ............................................ B23p 19/00
[58] Field of Search............ 29/200 P, 200 J, 200 R, 29/200 B, 203 P, 237

[56] References Cited
UNITED STATES PATENTS

| | | | |
|---|---|---|---|
| 3,571,896 | 3/1971 | Wilkerson | 29/237 |
| 3,593,402 | 7/1971 | Mori | 29/200 P |
| 3,633,813 | 1/1972 | Looney | 29/200 P X |
| 3,644,977 | 2/1972 | Valentine | 29/200 P |
| 3,653,115 | 4/1972 | Perkins | 29/237 |
| 3,711,920 | 1/1973 | Simmons, Jr. | 29/200 P |

*Primary Examiner*—Thomas H. Eager
*Attorney, Agent, or Firm*—Oliver D. Olson

[57] ABSTRACT

A pair of C-shaped clamps are interconnected pivotally in spaced-apart relation by an extensible and retractable hydraulic piston cylinder unit. The clamps are laid over a pair of pipes to be joined, one on each side of the joint, and the piston-cylinder unit operated from a remote position in the direction to shorten its length, whereupon the clamps are caused to grip the pipes and pull them together into sealed connection at the joint.

6 Claims, 2 Drawing Figures

PIPE JOINER

BACKGROUND OF THE INVENTION

This invention relates to the joining of fluid-conveying pipes, and more particularly to a novel and versatile pipe joiner.

Fluid conveying pipes, such as those made of cast metal and utilized for the conveying of water and a variety of other liquids, include an enlarged collar at one end provided with an internal annular seal of rubber or other material by which to seal the opposite end of an adjacent pipe. Considerable force is required to press the smaller diameter end of the adjacent pipe into the seal. In the case of water pipe, such force generally is supplied by a bull dozer, back hoe, or other similar power equipment. This procedure is very costly, not only in the requirement to provide such power equipment and to transport it to the site of operation, but also because of the excessive time involved in maneuvering such equipment to effect the pipe joining operation.

Portable pipe joining equipment has been provided heretofore in a variety of manually operated and powered forms. Many are either incapable of use in trenches in which a pipe line is to be laid, or are very difficult and cumbersome to manipulate in such trenches. Some utilize the end collars for abutment, and hence must be as long as the sections of pipe. These and others are of complex and costly construction and involve considerable time and manpower in their use.

SUMMARY OF THE INVENTION

In its basic concept, the pipe joiner of this invention includes a pair of spaced, C-shaped clamp members having diametrically opposed pipe-gripping edges and interconnected substantially in the plane of said edges by an extensible and retractable power unit, the clamp members functioning to grip adjacent pipe sections and pull them together upon retraction of the power unit.

It is by virtue of the foregoing basic concept that the principle objective of this invention is achieved; namely, to overcome the aforementioned disadvantages and limitations of prior pipe joining equipment.

Another important object of this invention is the provision of a pipe joiner of the class described which is of simplified construction for economical manufacture, which is sufficiently light in weight as to be maneuverable by a single individual, which may be utilized effectively in trenches, and may be operated from a remote position.

The foregoing and other objects and advantages of this invention will appear from the following detailed description, taken in connection with the accompanying drawing of a preferred embodiment.

DESCRIPTION OF THE PREFERRED EMBODIMENT

Figure 1:
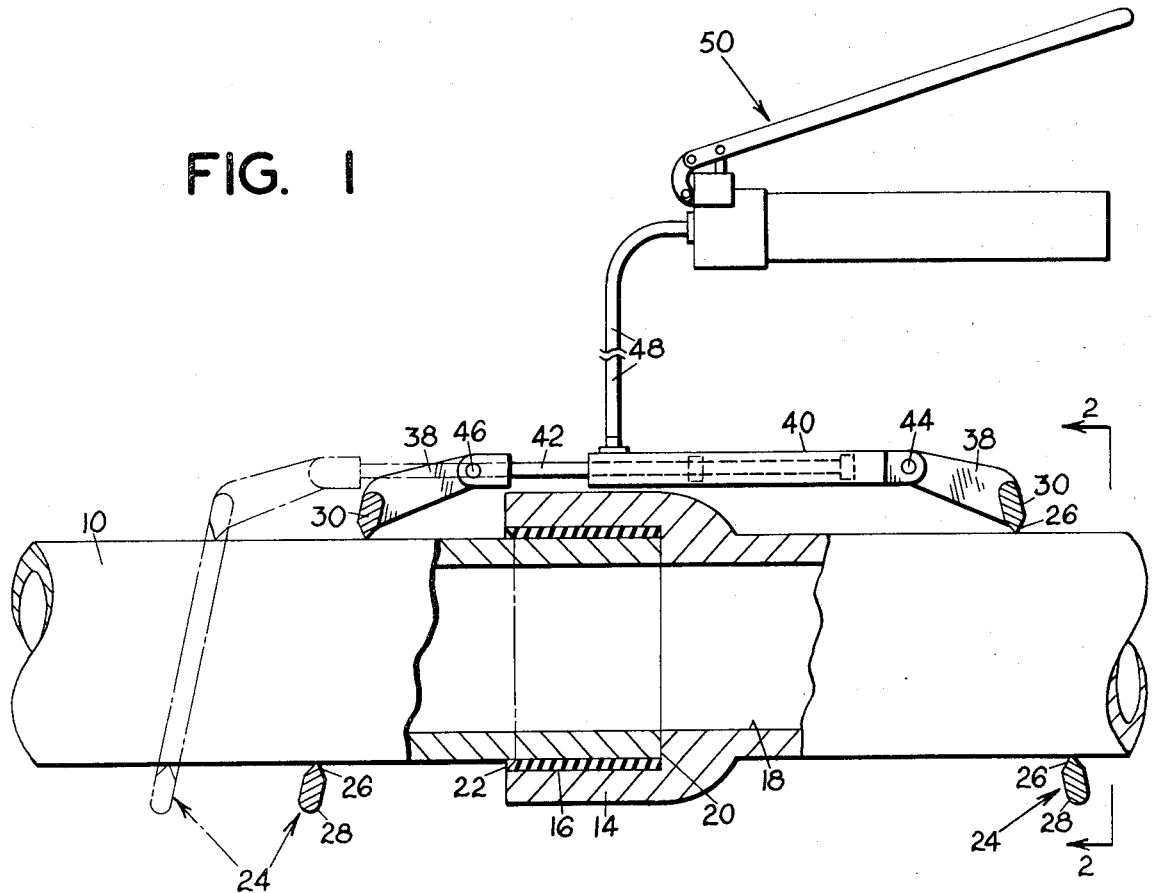
FIG. 1 is a fragmentary plan view of adjacent portions of pipes, partly broken away to disclose details of internal construction, having mounted thereon a pipe joiner embodying the features of this invention, the pipe joiner being shown in sectional view taken on the line 1—1 in FIG. 2.

FIG. 1 illustrates portions of adjacent sections 10 and 12 of conventional cast iron pipe. One end of each pipe is provided with an enlarged collar 14. The collar is provided with an internal bore 16 of larger diameter than the main bore 18 of the pipe, forming a shoulder 20 therebetween for abutment by the inner end of an adjacent section of pipe.

Means is provided for forming a fluid tight seal between adjacent sections of coupled pipe. In the embodiment illustrated, such a seal is provided by an annular resilient ring 22 of rubber or other suitable sealing material. It is because of the necessity of such a seal that considerable force is required to pull the pipe sections together into sealing engagement.

The pipe joiner of this invention includes a pair of substantially C-shaped clamp members 24 of steel or other structurally rigid material. The diametrically opposed ends of each clamp member have facing edges which form pipe-gripping edges 26. It will be apparent from the drawing that the distance between the opposed edges 26 is greater than the diameter of the associated pipe.

Figure 2:
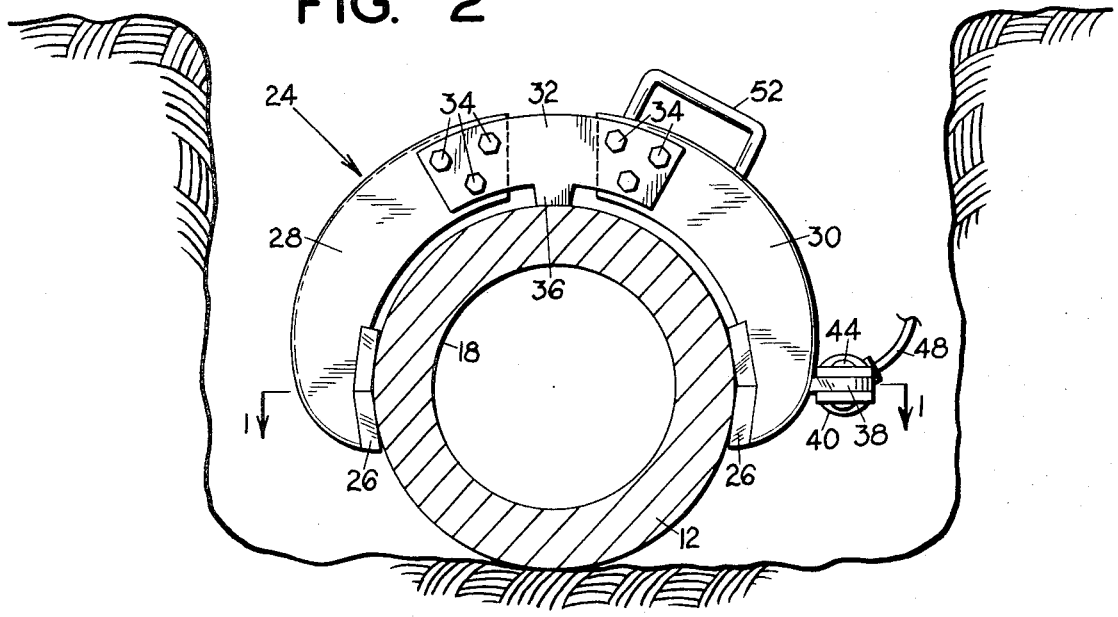
FIG. 2 is a transverse section taken on the line 2—2 in FIG. 1 and showing the operative position of the pipe joiner on adjacent sections of pipe contained in a trench.

Although each clamp member may be of single piece construction, providing a fixed diameter opening for use with a corresponding size of pipe, the preferred construction illustrated in FIG. 2 affords adjustment to various diameters to accommodate use with a range of pipe sizes. Thus, each clamp member is formed of two arcuate sections 28 and 30 each of which carries one of the pipe-gripping edges 26. A connecting plate 32 joins the sections together in a predetermined diameter as by means of bolts 34. The plate has a central projection 36 of predetermined length disposed to engage the pipe and thus locate the pipe-gripping edges 26 at diametrically opposite sides of the pipe.

When it is desired to use the pipe joiner with different diameter pipe, an appropriately sized connecting plate 32 is substituted for the one illustrated. Thus, if the pipe is of larger diameter, the plate 32 will be arranged to space the facing ends of the sections 28 and 30 farther apart and the projection 36 will be shorter than illustrated. Conversely, if the pipe is of smaller diameter, the plate 32 will be arranged to space the facing ends of the sections 28 and 30 closer together and the projection 36 will be longer than illustrated.

The pair of clamp members 24 are spaced apart longitudinally, and interconnected by power means for movement toward and away from each other. To this end, an arm 38 is secured to each clamp member. Each arm is disposed substantially in the diametric plane of the opposed gripping edges 26 of the associated clamp member and extends in the longitudinal direction of the pipe-receiving opening thereof. The arms extend toward each other and are interconnected pivotally by an extensible and retractable power unit. In the embodiment illustrated, this unit comprises a fluid pressure piston-cylinder unit, preferably of the hydraulic type. The end of the cylinder 40 opposite the projecting piston rod 42 is connected pivotally to one of the arms 38 by means of a pivot pin 44, while the projecting end of the piston rod is connected pivotally to the other arm by means of a pivot pin 46.

An elongated flexible conduit 48 is connected at one end to the piston rod end of the cylinder 40 and at its opposite end to a source of hydraulic fluid pressure. In the illustrated embodiment this source comprises a conventional manually operated hydraulic pump 50.

Each of the clamp members 24 is provided with a handle 52 by which to carry and manipulate the assembly. In the embodiment illustrated, the handles are formed of metal rods bent to the shape of a bale and secured, as by welding, to the clamp members in a position such that when the assembly is lifted, the open ends of the clamp members face downward.

The operation of the pipe joiner described hereinbefore is as follows: Let it be assumed that a pipe line is to be laid in a trench formed in the ground (FIG. 2) and that a pair of pipe sections 10 and 12 are disposed adjacent each other, with the small diameter end of one section (10) centered within the outer end portion of the annular sealing ring 22 in the coupling collar 14 of the adjacent pipe section (12), as illustrated in broken lines in FIG. 1.

The piston-cylinder unit is moved to its extended position, by opening a by-pass line in the hydraulic pump 50 and allowing the spring loading of the piston to move the clamp members apart, to the position illustrated in broken lines in FIG. 1. If necessary, the operator may assist the spring loading by pulling outward on one of the clamp members. The by-pass line then is closed.

With the projections 36 of the clamp members resting upon the pipe sections, on opposite sides of the coupling collar 14, the pump 50 is manipulated to supply hydraulic fluid under pressure to the piston rod end of the cylinder 40, whereupon the piston rod is caused to retract into the cylinder. The clamp members thus are tilted angularly (FIG. 1) with respect to the pipe sections, by pivoting on the projections 36, causing the sharpened gripping edges 26 of the clamp members to be brought into engagement with the pipe sections. As the piston-cylinder unit is further retracted to shorter dimension, the pipe sections are pulled together, whereupon the smaller diameter end of one section is forced inwardly through the annular sealing ring 16 into abutment with the shoulder 20.

The by-pass in the hydraulic pump 50 then is opened to allow extension of the piston-cylinder unit, with consequent release of engagement of the clamp members with the pipe sections. The pipe joiner assembly then may be removed to the next location for subsequent use, by means of the handles 52.

The pump 50 may be positioned within the trench for manipulation by an operator in the trench. However, the flexible conduit 48 preferably is of sufficient length to permit the pump to be located at a suitable position remote from the trench. If the trench is quite deep, it may be more practicable to utilize two operators, one stationed in the trench to manipulate the joiner assembly and the other stationed at the remote position of the pump.

From the foregoing it will be appreciated that this invention provides a pipe joiner of simplified but rugged construction for economical manufacture and long service life, which may be utilized conveniently in the confined spaces of a trench, with operation from a position remote from the trench, if desired. Operation of the pipe joiner is completely independent of abutments or other projections on the pipes, and hence may be utilized with pipes of various types and lengths.

It will be apparent to those skilled in the art that various changes may be made in the size, shape, type, number and arrangement of parts described hereinbefore. For example, the piston-cylinder unit illustrated is of the single acting type, preferably spring loaded to assist in its extension. However, the unit may be of the double acting type, to facilitate extension of the unit and also to afford use of the pipe joiner to push pipes apart, as will be apparent. In such event, the source of fluid under pressure is chosen to accommodate the double acting piston cylinder unit, as will be understood. The manually operated pump 50 may be replaced by a power-driven pump. In either case, the pump may be secured to or otherwise integrated directly with the cylinder 40, for manipulation by an operator in the trench. The foregoing and other modifications may be made, as desired, without departing from the spirit of this invention.

Having now described my invention and the manner in which it may be used, I claim:

1. A pipe joiner, comprising
   a. a pair of spaced-apart, rigid-C-shaped clamp members each having an opening dimensioned to receive a pipe freely therein and diametrically opposed pipe gripping edges adjacent the opposite ends of each of the clamp members, each of the clamp members having a pipe-abutting portion intermediate the pipe-gripping edges arranged to engage a pipe, and
   b. extensible and retractable power means interconnecting the clamp member adjacent one of the pipe-gripping edges of each of the clamp members and in a plane extending substantially through the pairs of pipe gripping edges of the clamp members,
   c. whereby retraction of the power means effects angular tilting of the clamp members pivotally about their pipe-abutting intermediate portions toward each other and consequent gripping engagement of the clamp members with a pair of adjacent pipes to be joined.

2. The pipe joiner of claim 1 wherein the power means comprises a fluid pressure piston-cylinder unit connected at its opposite ends pivotally to the spaced clamp members.

3. The pipe joiner of claim 2 including a source of fluid under pressure, and flexible conduit means interconnecting the cylinder of the unit and said source of fluid under pressure for operating the piston-cylinder unit from a remote position.

4. The pipe joiner of claim 1 wherein the power means comprises a fluid pressure piston-cylinder unit connected at its opposite ends pivotally to the spaced clamp members, and including a manually operated hydraulic pump, and flexible conduit means interconnecting the cylinder of the unit and said pump for operating the piston-cylinder unit from a remote position.

5. The pipe joiner of claim 1 wherein each clamp member includes
   a. a pair of arcuate sections each carrying one of said pipe-gripping edges, and
   b. a connector member securing said sections together in a predetermined diameter.

6. The pipe joiner of claim 5 including a projection on the connector member extending inward thereof for engaging a pipe to position the gripping edges at diametrically opposed points on the pipe.

* * * * *